United States Patent
Li et al.

(10) Patent No.: US 10,933,404 B2
(45) Date of Patent: Mar. 2, 2021

(54) PREPARATION AND APPLICATION OF SILVER-MODIFIED SPIRAL TITANIUM DIOXIDE NANO-FIBER PHOTOCATALYST

(71) Applicant: HOHAI UNIVERSITY, Nanjing, Jiangsu (CN)

(72) Inventors: Yi Li, Jiangsu (CN); Chi Zhang, Jiangsu (CN); Jie Li, Jiangsu (CN); Dawei Wang, Jiangsu (CN); Wenlong Zhang, Jiangsu (CN)

(73) Assignee: HOHAI UNIVERSITY (CN)

( * ) Notice: Subject to any disclaimer, the term of this patent is extended or adjusted under 35 U.S.C. 154(b) by 405 days.

(21) Appl. No.: 15/752,855

(22) PCT Filed: Jun. 7, 2016

(86) PCT No.: PCT/CN2016/085030
§ 371 (c)(1),
(2) Date: Feb. 14, 2018

(87) PCT Pub. No.: WO2017/036221
PCT Pub. Date: Mar. 9, 2017

(65) Prior Publication Data
US 2018/0221856 A1    Aug. 9, 2018

(30) Foreign Application Priority Data
Aug. 31, 2015 (CN) .......................... 2015 1 0545955

(51) Int. Cl.
*B01J 35/06* (2006.01)
*B01J 23/50* (2006.01)
(Continued)

(52) U.S. Cl.
CPC ............ *B01J 23/50* (2013.01); *B01J 21/063* (2013.01); *B01J 35/004* (2013.01);
(Continued)

(58) Field of Classification Search
CPC ...... B01J 35/002; B01J 20/20; B01J 27/1817; B01J 37/343; B01J 37/342; B01J 35/004; B01J 37/0219; B01J 35/0013; B01J 20/28007; B01J 31/06; B01J 21/185; C02F 1/001; C02F 1/725; C02F 1/30;
(Continued)

(56) References Cited

PUBLICATIONS

Ag@helical chiral TiO2 nanofibers for visible light photocatalytic degradation of 17a-ethinylestradiol, Zhang,C., Environ Sci pollut Res, vol. 22, Serial 14, p. 10444-10451.
(Continued)

*Primary Examiner* — Cameron J Allen

(57) ABSTRACT

The present invention discloses a preparation method of a silver-modified spiral Titanium Dioxide ($TiO_2$) nano-fiber photocatalyst, comprising the following steps: preparing a spiral $TiO_2$ nano-fiber; preparing a nano-silver aqueous solution; and preparing a silver-modified spiral $TiO_2$ nano-fiber photocatalyst. The photocatalyst is coupled with the spiral structure of the nano-fiber and nano-silver particles with a specific size, improving the photocatalytic activity of the photocatalyst. Moreover, the sterilizing and biological pollution resisting capacities of the photocatalyst are also improved through the modified nano-silver particles, and therefore, the photocatalyst can be widely applied to a deep sewage treatment system.

7 Claims, 5 Drawing Sheets

(51) Int. Cl.
*B01J 21/06* (2006.01)
*B01J 35/00* (2006.01)
*C02F 1/32* (2006.01)
*B01J 37/34* (2006.01)
*B01J 37/00* (2006.01)
*B01J 37/03* (2006.01)
*B01J 35/02* (2006.01)
*B01J 37/02* (2006.01)
*C02F 1/72* (2006.01)
*C02F 101/34* (2006.01)
*C02F 1/50* (2006.01)
*C02F 101/30* (2006.01)
*C02F 101/38* (2006.01)

(52) U.S. Cl.
CPC ....... *B01J 35/0006* (2013.01); *B01J 35/0013* (2013.01); *B01J 35/023* (2013.01); *B01J 35/06* (2013.01); *B01J 37/0018* (2013.01); *B01J 37/0072* (2013.01); *B01J 37/0213* (2013.01); *B01J 37/031* (2013.01); *B01J 37/343* (2013.01); *B01J 37/345* (2013.01); *C02F 1/32* (2013.01); *C02F 1/725* (2013.01); *C02F 1/505* (2013.01); *C02F 2101/305* (2013.01); *C02F 2101/345* (2013.01); *C02F 2101/38* (2013.01); *C02F 2303/04* (2013.01); *C02F 2305/08* (2013.01); *C02F 2305/10* (2013.01)

(58) Field of Classification Search
CPC ...... C02F 2303/04; C02F 1/505; C02F 1/283; C02F 2101/30; C02F 2305/08; C02F 2101/308; C02F 2301/026; C02F 2305/10; C02F 1/32; C02F 2103/365; C02F 1/72; C02F 1/28; C02F 1/00
See application file for complete search history.

(56) References Cited

PUBLICATIONS

SIPO, First Office Action, dated Apr. 17, 2017, Application No./Patent No. 201510545955.X.
SIPO, Second Office Action, dated Oct. 25, 2017, Application No./Patent No. 201510545955.X.

ness of the nano-silver particle with the same size in the solution is far less than the denseness after nano-silver particles are modified on the spiral TiO$_2$ nano-fiber in the present invention, which is the main reason that the SPR effect generated during in-situ modification is more obvious.

PREPARATION AND APPLICATION OF SILVER-MODIFIED SPIRAL TITANIUM DIOXIDE NANO-FIBER PHOTOCATALYST

FIELD

The present invention relates to a preparation method and application of a catalyst, and specifically relates to a preparation method and application of a silver-modified spiral TiO$_2$ nano-fiber photocatalyst, and belongs to the technical field of environment pollution treatment.

BACKGROUND

Photocatalytic oxidation technology is a novel advanced oxidation technology, and has broad application prospects in environment pollution treatment. In numerous semiconductor photocatalysts, Titanium Dioxide (TiO$_2$) is widely developed and applied due to the characteristics such as high photoactivity, low cost, low toxicity, and good chemical stability and heat stability. For a TiO$_2$ photocatalyst of a nano-structure, an enclosed structure of spherical particles increases the electron-hole recombination rate, and moreover, a one-dimensional structure (e.g., the nano-fiber) has special physical and chemical properties and photoelectric properties, and this has attracted a lot of attention from researchers.

However, the TiO$_2$ nano material has larger band gap, low quantum yield, and fast charge recombination, and is hard to satisfy actual requirements under sun exposure. For that reason, TiO$_2$ needs to be modified. A modification method comprises: morphology engineering, nonmetal and metal doping, other semiconductor coupling, noble metal deposition and the like, wherein noble metal (silver, gold, platinum, palladium and the like) deposition may form a schottky barrier with TiO$_2$, which can greatly increase separation of photogenerated electron hole pairs and promote the interface electron transfer process so as to improve the photocatalytic reaction rate.

Recently, Awazu et al. (Journal of the American Chemical Society, 130, 1676-1680) proposes the concept of plasma photocatalyst, i.e., a series of novel photocatalysts with a Surface Plasma Resonance (SPR) effect. Researches show that the SPR effect plays an important role in improving the photocatalytic activity of a plasma metal/semiconductor. However, related researches still need to be conducted for how to apply the effect to the field of photocatalysts.

SUMMARY

To solve the drawbacks of the prior art, the purpose of the present invention is to provide a preparation method of a silver-modified spiral TiO$_2$ nano-fiber photocatalyst. The photocatalyst can be used for degradation of organic pollutants and inactivation of pathogenic bacteria in water environment.

To achieve said purpose, the present invention adopts the following technical solution.

The present invention first discloses a preparation method of a silver-modified spiral TiO$_2$ nano-fiber photocatalyst, comprising the following steps:

S1. preparing a spiral TiO$_2$ nano-fiber: transcribing the structure of amino acid derivatives to prepare the spiral TiO$_2$ nano-fiber;

the specific operation process comprises: weighing 0.10-0.15 g of C$_{18}$-D-glutamic acid to be dissolved in 45.3-68.0 g of methanol solution, adding 270-400 mL of deionized water, and stirring at the room temperature for 10 min to prepare a mixed solution; then weighing 0.97-1.45 g of bis(2,4-pentanedionate)bis(2-pyruvate)titanium to be added in the mixed solution, stirring at 55° C. for 2 hours to obtain an intermediate product; centrifugally separating the obtained intermediate product, freezing and drying at −60° C. overnight to obtain a light yellow powder; calcining the light yellow powder at 550° C. for 6 hours to obtain a white powder, the white powder being the spiral TiO$_2$ nano-fiber. In the step, the average length of the prepared spiral TiO$_2$ nano-fiber is about 500 nm, and the average diameter thereof is about 40 nm.

S2. preparing a nano-silver aqueous solution: preparing the stable nano-silver aqueous solution with a uniform particle size based on the Tollens reaction;

the specific operation process comprises: mixing a silver nitrate solution with the mass fraction of 24-30% and ammonium hydroxide with the mass fraction of 28-34% to prepare reagent A, mixing a sodium hydroxide solution with the mass fraction of 7-12% and ammonium hydroxide with the mass fraction of 6-10% to prepare reagent B, and mixing formaldehyde with the mass fraction of 0.3% and sorbitol with the mass fraction of 27-33% to prepare reagent C (the percentage herein is the mass fraction); adding 0.5 mL of the reagent A to 14 mL of deionized water, adding 0.5 mL of the reagent B, and filling to volume of 300 mL to prepare reagent SAB; individually filling 0.5 mL of the reagent C to volume of 300 mL to prepare reagent SC; and mixing 0.9 mL of the reagent SAB and 0.9 mL of the reagent SC with 10 mL of water, sealing and placing in a numerical control ultrasonic vibrator for ultrasonic vibration to obtain the nano-silver particle aqueous solution.

In particular, it should be noted that the ultrasonic vibration time directly affects the size of the nano-silver particle. In the present invention, the adopted ultrasonic vibration times are 15 min, 27 min, and 33 min, respectively to obtain three nano-silver particle aqueous solutions with different sizes. The particle diameters of the nano-silver particles are 4-6 nm (small size), 12-14 nm (middle size), and 30-32 nm (large size), respectively corresponding to the three different ultrasonic vibration times.

S3. preparing a silver-modified spiral TiO$_2$ nano-fiber photocatalyst: modifying the nano-silver particles prepared in step S2 onto the spiral TiO$_2$ nano-fiber prepared in step S1 by using a chemical deposition method.

the specific operation process comprises: weighing three parts of 0.2 g of silver-modified spiral TiO$_2$ nano-fibers prepared in step S1, and respectively dissolving in three kinds of 100 mL nano-silver aqueous solutions prepared in step S2; adjusting pH of three mixtures to 3.5 with perchloric acid, stirring at the room temperature for 60 min, and then continuously stirring for 40 min at a nitrogen atmosphere under irradiation of a 8 W ultraviolet lamp; and centrifugally separating a product, washing the product multiple times with double-distilled water, and finally drying at 80° C. for 8 hours to obtain three parts of brown powders with different chromaticity, i.e., small-sized, middle-sized, and large-sized nano-silver particle-modified spiral TiO$_2$ nano-fibers. Upon detection, the capacities of nano-silvers with different sizes are 3.3%, 3.1%, and 3.1%, respectively according to the sizes in an ascending order.

In the present invention, on one hand, a nano-sized spiral structure can adjust the angle of incident light and change the wavelength and frequency of the incident light through optical effects such as scattering and scattering so that the frequency can match the SPR frequency of nano-silver particle with specific size to cause greater SPR effect. Such resonance can enhance the interreaction of the nano-silver particle with specific size and light so as to further promote the SPR effect of the nano-silver particle and increase the absorption of $TiO_2$ to the visible light. On the other hand, changing the size and shape of noble metal nano-particle can adjust the SPR frequency thereof so as to enhance the absorption of noble metal nano-particle to the visible light.

The nano-silver particle has special SPR property, and free electrons on the surface thereof would produce collective vibration under irradiation of the visible light so that the nano-silver particle has a strong reaction with the visible light. The present invention prepares a novel visible light photocatalyst with high activity and stability through coupling the $TiO_2$ nano-fiber of the spiral structure with the nano-silver particle of suitable size by using special catalyzing, electrical, and optical properties of silver. The photocatalyst can be applied to degradation of organic pollutants and inactivation of pathogenic bacteria in water environment. In particular, the middle-sized nano-filter-modified spiral $TiO_2$ nano-fiber photocatalyst almost completely degrades 5 mg/L of ethinyloestradiol (EE2) with one hour and almost completely inactivates $1 \times 10^7$ cfu/mL of *Escherichia coli* within 30 min.

The present invention has the following advantages: the $TiO_2$ photocatalyst obtained by the preparation method of the present invention is coupled with the spiral structure of the nano-fiber and nano-silver particles with a specific size; the incident light changes the wavelength and frequency thereof through the spiral structure, and resonates with the nano-silver particles with the specific size, exciting a part of the nano-silver that would not be excited, enhancing the SPR effect, exciting the SPR effect through resonance to the maximum extent, and improving absorption of the photocatalyst to the visible light, so as to improve the photocatalytic activity of the photocatalyst. Moreover, the sterilizing and biological pollution resisting capacities of the material are also improved through the modified nano-silver particles. In addition, the visible light photocatalyst of the present invention is good in light stability and can be reused, organic pollutants of complex structures can be efficiently degraded, pathogenic bacteria can be degraded and inactivated, the inactivating efficiency is not obviously reduced when the photocatalyst is reused.

DETAILED DESCRIPTION

Figure 1:
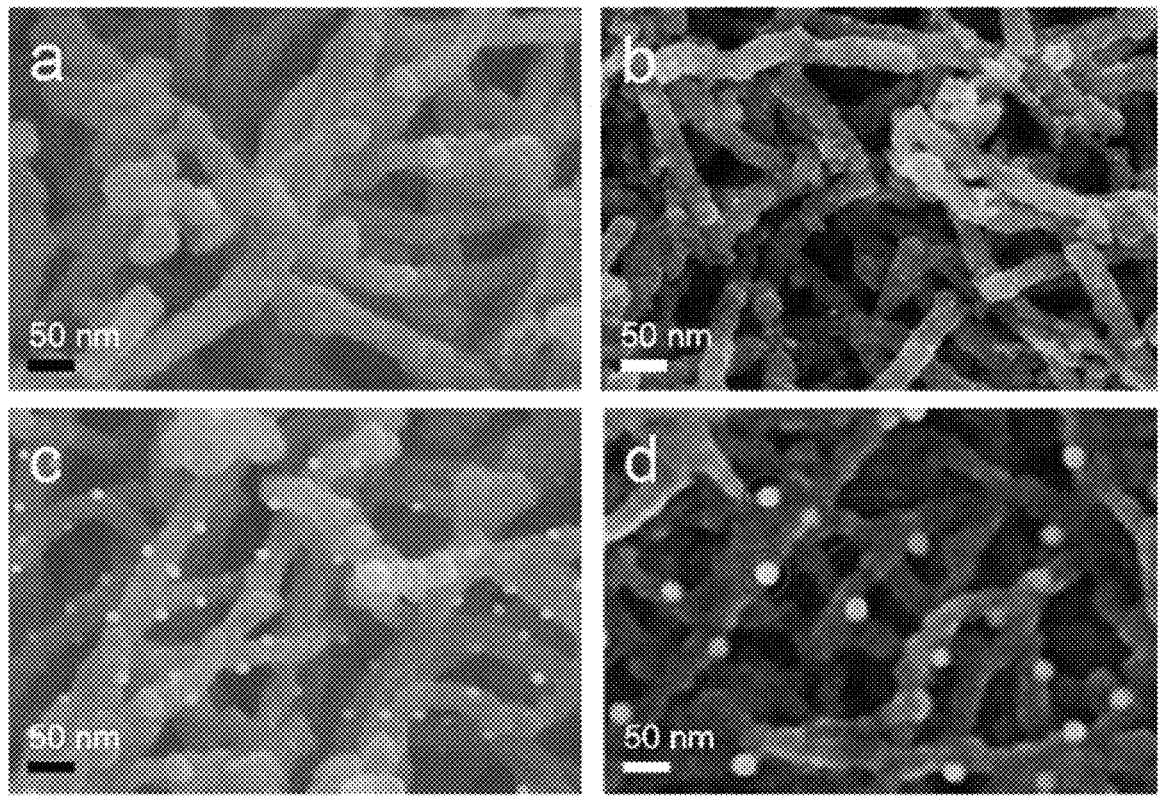
FIG. 1 is a Scanning Electron Microscope (SEM) diagram of a photocatalyst obtained by the preparation method of the present invention, wherein a is a pure spiral $TiO_2$ nano-fiber, b is a small-sized nano-silver-modified spiral $TiO_2$ nano-fiber, c, is a middle-sized nano-silver-modified spiral $TiO_2$ nano-fiber, and d is a large-sized nano-silver-modified spiral $TiO_2$ nano-fiber.

The prevent invention is specifically introduced with a combination of the accompanying drawings and the specific embodiments.

All raw materials are purchased in markets, unless otherwise described in the present invention.

Embodiment 1-1

This embodiment prepares a pure spiral $TiO_2$ nano-fiber, and the preparation process is as follows:

weighing 0.12 g of Ca-D-glutamic acid to be dissolved in 54.4 g of methanol solution, adding 320 mL of deionized water, and stirring at the room temperature for 10 min to prepare a mixed solution; then weighing 1.16 g of bis(2,4-pentanedionate)bis(2-pyruvate)titanium to be added in the mixed solution, stirring at 55° C. for 2 hours to obtain an intermediate product; centrifugally separating the obtained intermediate product, freezing and drying at −60° C. overnight to obtain a light yellow powder; calcining the light yellow powder at 550° C. for 6 hours to obtain a white powder, the white powder being the spiral $TiO_2$ nano-fiber.

Upon detection, the average length of the pure spiral $TiO_2$ nano-fiber photocatalyst prepared in this embodiment is about 500 nm, and the average diameter thereof is about 40 nm.

Embodiment 1-2

This embodiment prepares a pure spiral $TiO_2$ nano-fiber, and the preparation process is as follows:

weighing 0.10 g of $C_{18}$-D-glutamic acid to be dissolved in 45.3 g of methanol solution, adding 270 mL of deionized water, and stirring at the room temperature for 10 min to prepare a mixed solution; then weighing 0.97 g of bis(2,4-pentanedionate)bis(2-pyruvate)titanium to be added in the mixed solution, stirring at 55° C. for 2 hours to obtain an intermediate product; centrifugally separating the obtained intermediate product, freezing and drying at −60° C. overnight to obtain a light yellow powder; calcining the light yellow powder at 550° C. for 6 hours to obtain a white powder, the white powder being the spiral $TiO_2$ nano-fiber.

Upon detection, the average length of the pure spiral $TiO_2$ nano-fiber photocatalyst prepared in this embodiment is about 500 nm, and the average diameter thereof is about 40 nm.

Embodiment 1-3

This embodiment prepares a pure spiral $TiO_2$ nano-fiber, and the preparation process is as follows:

weighing 0.15 g of $C_{18}$-D-glutamic acid to be dissolved in 68.0 g of methanol solution, adding 400 mL of deionized water, and stirring at the room temperature for 10 min to prepare a mixed solution; then weighing 1.45 g of bis(2,4-pentanedionate)bis(2-pyruvate)titanium to be added in the mixed solution, stirring at 55° C. for 2 hours to obtain an intermediate product; centrifugally separating the obtained intermediate product, freezing and drying at −60° C. overnight to obtain a light yellow powder; calcining the light yellow powder at 550° C. for 6 hours to obtain a white powder, the white powder being the spiral $TiO_2$ nano-fiber.

Upon detection, the average length of the pure spiral $TiO_2$ nano-fiber photocatalyst prepared in this embodiment is about 500 nm, and the average diameter thereof is about 40 nm.

Embodiment 2

The stable and small-sized (4-6 nm) nano-silver aqueous solution is prepared based on the Tollens reaction:

the specific operation process comprises: mixing a silver nitrate solution with the mass fraction of 24-30% and ammonium hydroxide with the mass fraction of 28-34% to prepare reagent A, mixing a sodium hydroxide solution with the mass fraction of 7-12% and ammonium hydroxide with the mass fraction of 6-10% to prepare reagent B, and mixing formaldehyde with the mass fraction of 0.3% and sorbitol with the mass fraction of 27-33% to prepare reagent C; adding 0.5 mL of the reagent A to 14 mL of deionized water, adding 0.5 mL of the reagent B, and filling to volume of 300 mL to prepare reagent SAB; individually filling 0.5 mL of the reagent C to volume of 300 mL to prepare reagent SC; and mixing 0.9 mL of the reagent SAB and 0.9 mL of the reagent SC with 10 mL of water, sealing and placing in a numerical control ultrasonic vibrator for ultrasonic vibration for 15 min to obtain the small-sized (4-6 nm) nano-silver particle aqueous solution.

Then the small-sized nano-silver particles prepared in this embodiment are modified onto the spiral $TiO_2$ nano-fiber prepared in embodiment 1-1 by using a chemical deposition method:

the specific operation process comprises: weighing 0.2 g of spiral $TiO_2$ nano-fiber prepared in embodiment 1-1, and dissolving in 100 mL nano-silver aqueous solutions prepared in this embodiment; adjusting pH of the mixture to 3.5 with perchloric acid, stirring at the room temperature for 60 min, and then continuously stirring for 40 min at a nitrogen atmosphere under irradiation of a 8 W ultraviolet lamp; and centrifugally separating a product, washing the product multiple times with double-distilled water, and finally drying at 80° C. for 8 hours to obtain brown powders, i.e., small-sized (4-6 nm) nano-silver particle-modified spiral $TiO_2$ nano-fibers, wherein the capacity of nano-silver is 3.3%.

Embodiment 3

The stable and middle-sized (12-14 nm) nano-silver aqueous solution is prepared based on the Tollens reaction:

the specific operation process comprises: mixing a silver nitrate solution with the mass fraction of 24-30% and ammonium hydroxide with the mass fraction of 28-34% to prepare reagent A, mixing a sodium hydroxide solution with the mass fraction of 7-12% and ammonium hydroxide with the mass fraction of 6-10% to prepare reagent B, and mixing formaldehyde with the mass fraction of 0.3% and sorbitol with the mass fraction of 27-33% to prepare reagent C; adding 0.5 mL of the reagent A to 14 mL of deionized water, adding 0.5 mL of the reagent B, and filling to volume of 300 mL to prepare reagent SAB; individually filling 0.5 mL of the reagent C to volume of 300 mL to prepare reagent SC; and mixing 0.9 mL of the reagent SAB and 0.9 mL of the reagent SC with 10 mL of water, sealing and placing in a numerical control ultrasonic vibrator for ultrasonic vibration for 27 min to obtain the middle-sized (12-14 nm) nano-silver particle aqueous solution.

Then the middle-sized nano-silver particles prepared in this embodiment are modified onto the spiral $TiO_2$ nano-fiber prepared in embodiment 1-1 by using a chemical deposition method:

the specific operation process comprises: weighing 0.2 g of spiral $TiO_2$ nano-fiber prepared in embodiment 1-1, and dissolving in 100 mL nano-silver aqueous solutions prepared in this embodiment; adjusting pH of the mixture to 3.5 with perchloric acid, stirring at the room temperature for 60 min, and then continuously stirring for 40 min at a nitrogen atmosphere under irradiation of a 8 W ultraviolet lamp; and centrifugally separating a product, washing the product multiple times with double-distilled water, and finally drying at 80° C. for 8 hours to obtain brown powders, i.e., middle-sized (12-14 nm) nano-silver particle-modified spiral $TiO_2$ nano-fibers, wherein the capacity of nano-silver is 3.1%.

Embodiment 4

The stable and large-sized (30-32 nm) nano-silver aqueous solution is prepared based on the Tollens reaction:

the specific operation process comprises: mixing a silver nitrate solution with the mass fraction of 24-30% and ammonium hydroxide with the mass fraction of 28-34% to prepare reagent A, mixing a sodium hydroxide solution with the mass fraction of 7-12% and ammonium hydroxide with the mass fraction of 6-10% to prepare reagent B, and mixing formaldehyde with the mass fraction of 0.3% and sorbitol with the mass fraction of 27-33% to prepare reagent C; adding 0.5 mL of the reagent A to 14 mL of deionized water, adding 0.5 mL of the reagent B, and filling to volume of 300 mL to prepare reagent SAB; individually filling 0.5 mL of the reagent C to volume of 300 mL to prepare reagent SC; and mixing 0.9 mL of the reagent SAB and 0.9 mL of the reagent SC with 10 mL of water, sealing and placing in a numerical control ultrasonic vibrator for ultrasonic vibration for 33 min to obtain the large-sized (30-32 nm) nano-silver particle aqueous solution.

Then the large-sized nano-silver particles prepared in this embodiment are modified onto the spiral $TiO_2$ nano-fiber prepared in embodiment 1-1 by using a chemical deposition method:

the specific operation process comprises: weighing 0.2 g of spiral $TiO_2$ nano-fiber prepared in embodiment 1-1, and dissolving in 100 mL nano-silver aqueous solutions prepared in this embodiment; adjusting pH of the mixture to 3.5 with perchloric acid, stirring at the room temperature for 60 min, and then continuously stirring for 40 min at a nitrogen atmosphere under irradiation of a 8 W ultraviolet lamp; and centrifugally separating a product, washing the product multiple times with double-distilled water, and finally drying at 80° C. for 8 hours to obtain brown powders, i.e., large-sized (30-32 nm) nano-silver particle-modified spiral $TiO_2$ nano-fibers, wherein the capacity of nano-silver is 3.1%.

Morphology Detection

Embodiments 1-4 prepare the pure spiral $TiO_2$ nano-fiber, the small-sized nano-silver particle-modified spiral $TiO_2$ nano-fiber, the middle-sized nano-silver particle-modified spiral $TiO_2$ nano-fiber, and the large-sized nano-silver particle-modified spiral $TiO_2$ nano-fiber, respectively. Please refer to FIG. 1 for the SEM diagram of each product. It can be seen from FIG. 1 that the average length of the silver-modified spiral $TiO_2$ nano-fiber photocatalyst is about 500 nm, and the average diameter thereof is about 40 nm. Deposition of the nano-silver particles does not destroy the spiral structure of the $TiO_2$ nano-fiber, and the average particle diameters of the nano-silver particles of three sizes are 4-6 nm (small size), 12-14 nm (middle size), and 30-32 nm (large size), respectively.

Figure 2:
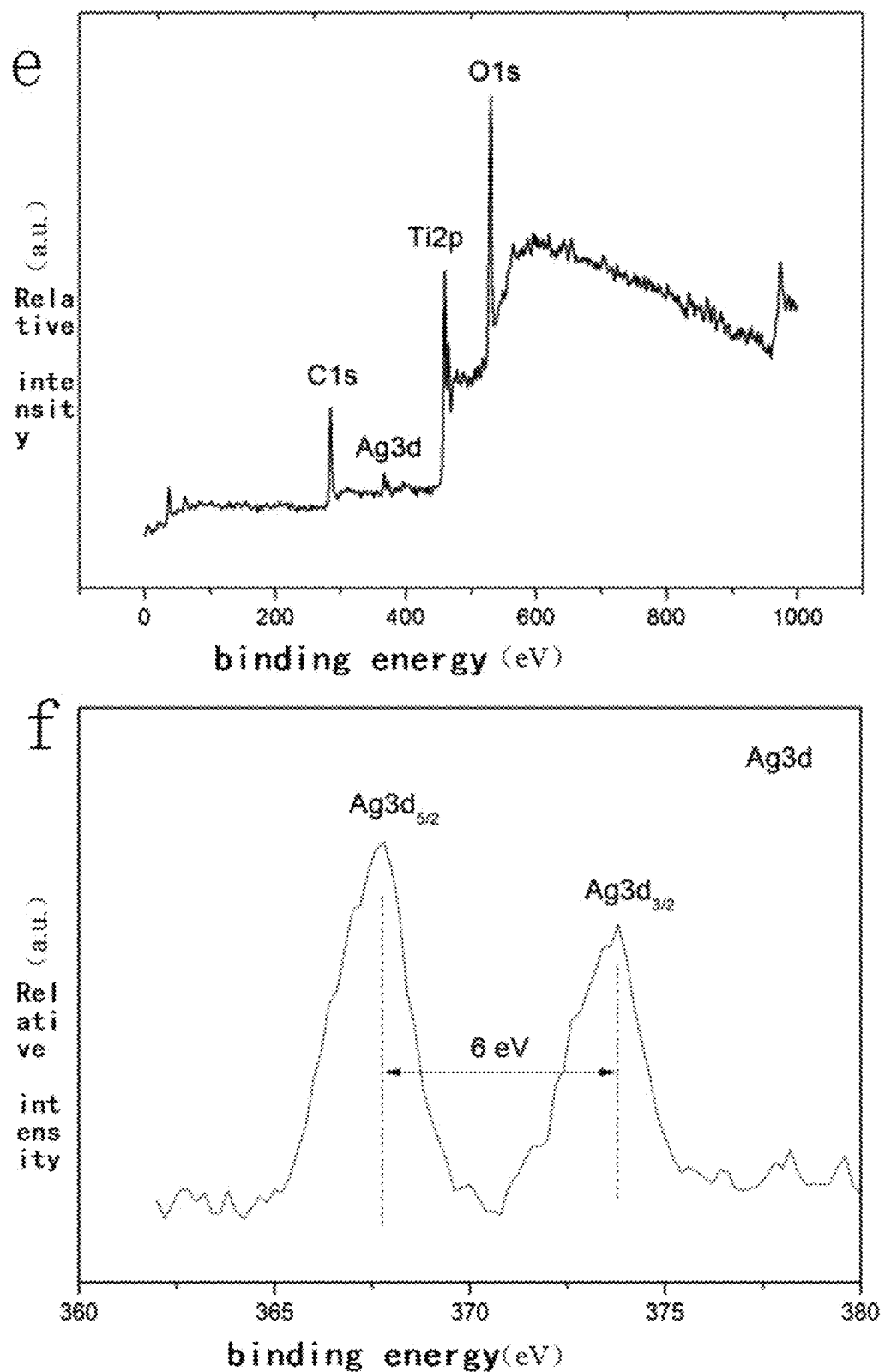
FIG. 2 is a Photoelectron Spectroscopy (XPS) diagram of the middle-sized nano-silver-modified spiral $TiO_2$ nano-fiber photocatalyst, wherein e is a full spectrum, and f is a high power spectrum.

FIG. 2 is an XPS diagram of the middle-sized nano-silver-modified spiral $TiO_2$ nano-fiber photocatalyst prepared in embodiment 2, wherein e is a full spectrum, and f is a high power spectrum. It can be seen from FIG. 2e that no other impurity element appears apart from a small number of carbon comprised in the XPS device. It can be seen from FIG. 2f that the modified nano-silver particles mainly exist in an elementary substance form.

Performance Detection (1). A photocatalytic degradation effect of the visible light photocatalyst of embodiments 1-4 to a pollutant in water, i.e., EE2:

Implementation conditions: a degradation reaction is conducted in a glass beaker, and the light source is a xenon arc lamp (300 W) provided with an ultraviolet filter which can provide visible light irradiation (the wavelength is greater than 400 nm).

Implementation process: weighing 0.5 mg of EE2 to be added in 100 mL of double-distilled water, then adding 0.1 g of ethanol to promote dissolution of EE2, and finally adding 0.1 g of photocatalyst. First, a reaction system is placed in a dark condition and stirred for 30 min to achieve adsorption desorption equilibrium of EE2. Then the xenon arc lamp is turned on to start a photocatalytic degradation reaction; the reaction lasts for one hour, 0.5 mL of water sample is taken every 10 min, and three repeated water samples are taken each time; after the photocatalyst is removed through centrifugation, the concentration of EE2 in the water samples is measured with a high performance liquid chromatograph, and all values are average values of three repeated water samples.

Figure 3:
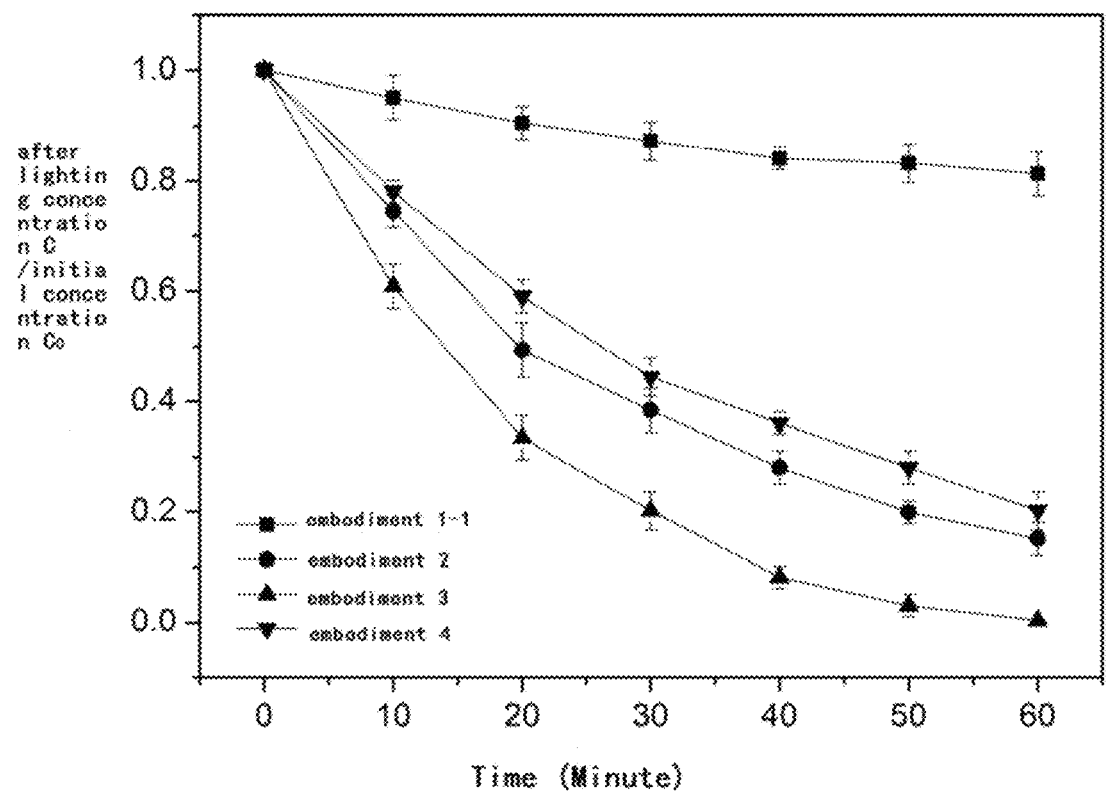
FIG. 3 is a comparison diagram of the removal effect of four photocatalysts to EE2.

FIG. 3 shows the experimental results of embodiments 1-4. The results indicate that: the pure spiral $TiO_2$ nano-fiber photocatalyst in embodiment 1-1 only degrades 19% of EE2. However, three silver-modified spiral $TiO_2$ nano-fiber photocatalyst in embodiments 2-4 degrade 85%, 100%, and 80% of EE2, respectively, i.e., the optimal particle diameter of modified nano-silver particle is 12-14 nm (middle size).

Figure 4:
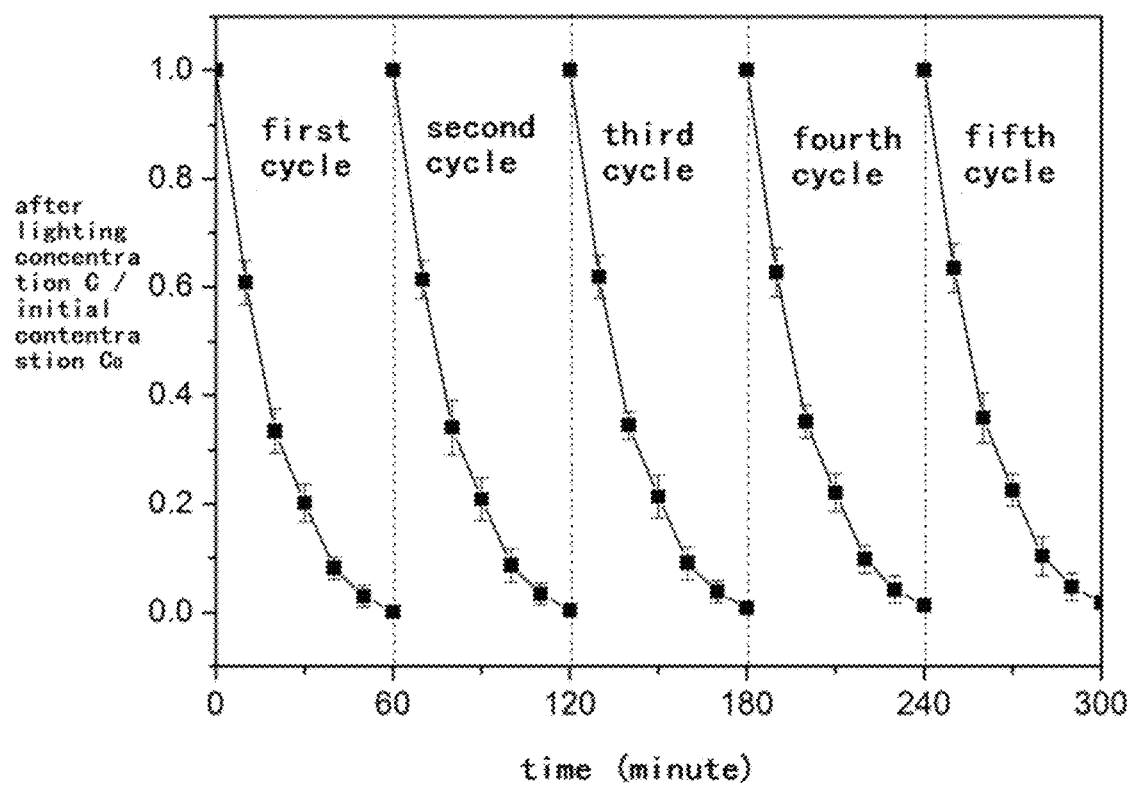
FIG. 4 is a comparison diagram of the removal effect of the middle-sized nano-silver-modified spiral $TiO_2$ nano-fiber photocatalyst when being reused to EE2.

(2). The middle-sized silver-modified photocatalyst is reused by using an extraction filtration washing method, and after being cycled by five times, the degradation efficiency of the photocatalyst to EE2 is not obviously reduced. Please refer to FIG. 4 for the detection result.

(3). The inactivation effect of the pure spiral $TiO_2$ nano-fiber photocatalyst and the middle-sized nano-silver-modified spiral $TiO_2$ nano-fiber photocatalyst when being reused to *Escherichia coli*:

multiplying *Escherichia coli* with a tryptone soybean broth medium, centrifuging the *Escherichia coli* after it enters a logarithmic phase at a shaking table of 37° C., discarding a supernatant, and washing with a phosphate buffer solution; centrifugally washing multiple times and then suspending the *Escherichia coli* in sterilized saline water (the mass fraction of NaCl is 0.9%), and adjusting pH to about 7 to finally obtain an *Escherichia coli* suspension with the concentration of about $1 \times 10^7$ cfu/mL.

0.1 g of photocatalyst is weighed to be added in 100 mL of *Escherichia coli* suspension, the xenon arc lamp is then turned on for continuous inactivation for 30 min, and finally three repeated water samples are taken to measure the average concentration of *Escherichia coli*. The water samples needs to be first diluted to a suitable concentration, and then agar plate count of *Escherichia coli* is conducted, all values are average values of three repeated water samples.

Figure 5:
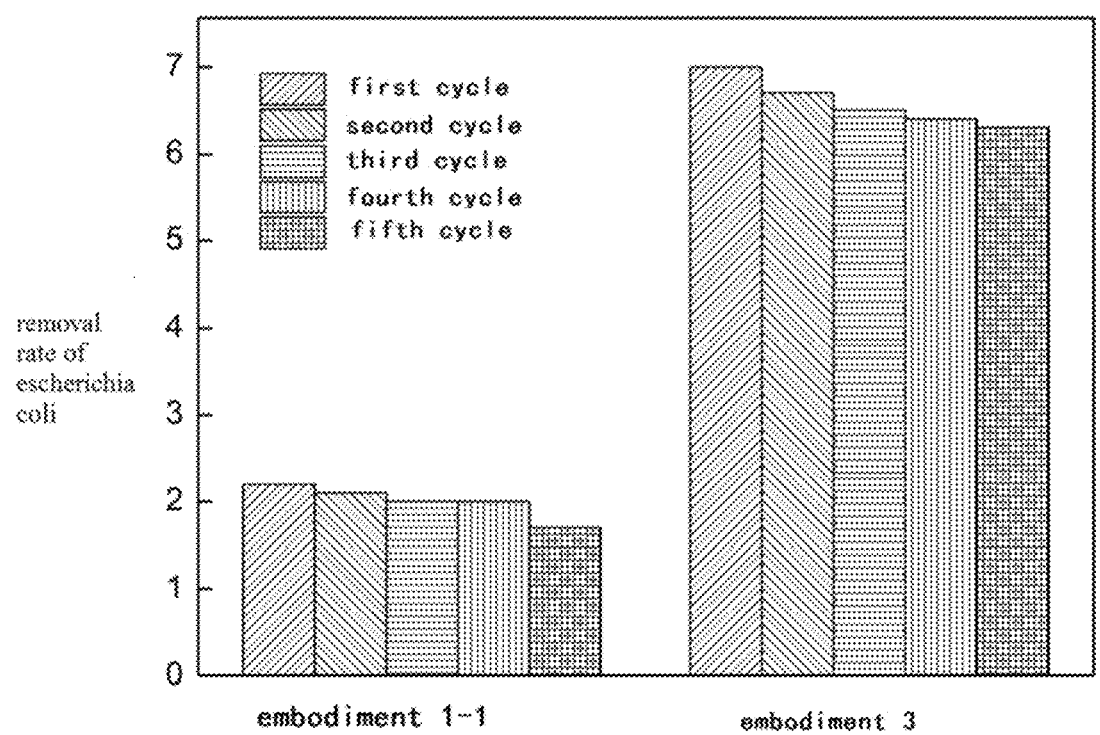
FIG. 5 is a comparison diagram of the removal effect of the pure spiral $TiO_2$ nano-fiber photocatalyst and the middle-sized nano-silver-modified spiral $TiO_2$ nano-fiber photocatalyst when being reused to *Escherichia coli*.

With reference to FIG. 5, the results of embodiments 1-1 and 3 indicate that the removal of *Escherichia coli* by the pure spiral $TiO_2$ nano-fiber photocatalyst is only level-2 logarithmic removal rate (2-log), while the removal of *Escherichia coli* by the middle-sized silver-modified $TiO_2$ nano-fiber photocatalyst can reach level-7 logarithmic removal rate (7-log). After being cycled for five times, the removal efficiency of the two photocatalysts to *Escherichia coli* is not obviously reduced.

In conclusion, the $TiO_2$ photocatalyst obtained by the preparation method of the present invention is coupled with the spiral structure of the nano-fiber and nano-silver particles with a specific size, exciting the SPR effect through resonance to the maximum extent, promoting the photocatalytic activity of the photocatalyst, improving absorption of the photocatalyst to the visible light, and moreover, also increasing the sterilizing and biological pollution resisting capacities of the material. The middle-sized nano-silver particle-modified $TiO_2$ nano-fiber photocatalyst has the strongest activity and the best degradation effect. In addition, the visible light photocatalyst of the present invention can be reused, and the efficiency fox degradation of organic pollutants and inactivation of pathogenic bacteria is not obviously reduced.

The contents above display and describe fundamental principles, main characteristics, and advantages of the present invention. A person of ordinary skill in the art shall understand that the aforementioned embodiments do not limit the present invention in any form, and the technical solutions obtained through equivalent substitution or equivalent transformation all fall within the scope of protection of the present invention.

What is claimed is:

1. A preparation method of a silver-modified spiral $TiO_2$ nano-fiber photocatalyst, comprising the following steps:
    S1. preparing a spiral $TiO_2$ nano-fiber: transcribing the structure of amino acid derivatives to prepare the spiral $TiO_2$ nano-fiber;
    S2. preparing a nano-silver aqueous solution: preparing the stable nano-silver aqueous solution with a uniform particle size based on a Tollens reaction; and
    S3. preparing a silver-modified spiral $TiO_2$ nano-fiber photocatalyst: modifying the nano-silver particles prepared in step S2 onto the spiral $TiO_2$ nano-fiber prepared in step S1 by using a chemical deposition method, wherein,
    specific operations of step S1 are: weighing 0.10-0.15 g of $C_{18}$-D-glutamic acid to be dissolved in 45.3-68.0 g of methanol solution, adding 270-400 mL of deionized water, and stirring at the room temperature for 10 min to prepare a mixed solution; then weighing 0.97-1.45 g of bis(2,4-pentanedionate)bis(2-pyruvate)titanium to be added in the mixed solution, stirring at 55° C. for 2 hours to obtain an intermediate product; centrifugally separating the obtained intermediate product, freezing and drying at −60° C. overnight to obtain a light yellow powder; and calcining the light yellow powder at 550° C. for 6 hours to obtain a white powder, the white powder being the spiral $TiO_2$ nano-fiber.

2. The preparation method of a silver-modified spiral $TiO_2$ nano-fiber photocatalyst according to claim 1, wherein,
    an average length of the prepared spiral $TiO_2$ nano-fiber is about 500 nm, and an average diameter thereof is about 40 nm.

3. The preparation method of a silver-modified spiral $TiO_2$ nano-fiber photocatalyst according to claim 1, wherein,
    specific operations of step S2 are: mixing a silver nitrate solution with the mass fraction of 24-30% and ammonium hydroxide with the mass fraction of 28-34% to prepare reagent A, mixing a sodium hydroxide solution with the mass fraction of 7-12% and ammonium hydroxide with the mass fraction of 6-10% to prepare reagent B, and mixing formaldehyde with the mass fraction of 0.3% and sorbitol with the mass fraction of 27-33% to prepare reagent C; adding 0.5 mL of the reagent A to 14 mL of deionized water, adding 0.5 mL of the reagent B, and filling to volume of 300 mL to prepare reagent SAB; individually filling 0.5 mL of the reagent C to volume of 300 mL to prepare reagent SC; and mixing 0.9 mL of the reagent SAB and 0.9 mL of the reagent SC with 10 mL of water, sealing and placing in a numerical control ultrasonic vibrator for ultrasonic vibration to obtain the nano-silver particle aqueous solution.

4. The preparation method of a silver-modified spiral $TiO_2$ nano-fiber photocatalyst according to claim 3, wherein,
the ultrasonic vibration times are 15 min, 27 min, and 33 min to obtain three nano-silver particle aqueous solutions with different sizes.

5. The preparation method of a silver-modified spiral $TiO_2$ nano-fiber photocatalyst according to claim 4, wherein,
the particle diameters of the nano-silver particles are a small size of 4-6 nm, a middle size of 12-14 nm, and a large size of 30-32 nm, respectively corresponding to the three different ultrasonic vibration times.

6. The preparation method of a silver-modified spiral $TiO_2$ nano-fiber photocatalyst according to claim 5, wherein,
specific operations of step S3 are: weighing three parts of 0.2 g of silver-modified spiral $TiO_2$ nano-fibers prepared in step S1, and respectively dissolving in three kinds of 100 mL, nano-silver aqueous solutions prepared in step S2; adjusting pH of three mixtures to 3.5 with perchloric acid, stirring at the room temperature for 60 min, and then continuously stirring for 40 min at a nitrogen atmosphere under irradiation of a 8 W ultraviolet lamp; and centrifugally separating a product, washing the product multiple times with double-distilled water, and finally drying at 80° C. for 8 hours to obtain three parts of brown powders with different chromaticity, i.e., small-sized, middle-sized, and large-sized nano-silver particle-modified spiral $TiO_2$ nano-fibers.

7. The preparation method of a silver-modified spiral $TiO_2$ nano-fiber photocatalyst according to claim 6, wherein,
the capacities of nano-silvers with different sizes are 3.3%, 3.1%, and 3.1%, respectively according to the sizes in an ascending order.

* * * * *